(12) United States Patent
Conlon et al.

(10) Patent No.: US 7,918,402 B2
(45) Date of Patent: Apr. 5, 2011

(54) ITEM LABELING, INSPECTION AND VERIFICATION SYSTEM FOR USE IN MANUFACTURING, PACKAGING, PRODUCT SHIPMENT-FULFILLMENT, DISTRIBUTION, OR ON-SITE OPERATIONS

(75) Inventors: Kevin M. Conlon, Berthoud, CO (US); Timothy J. Owens, Erie, CO (US)

(73) Assignee: Tension International, Inc., Kansas City, MO (US)

( * ) Notice: Subject to any disclaimer, the term of this patent is extended or adjusted under 35 U.S.C. 154(b) by 310 days.

(21) Appl. No.: 11/714,491

(22) Filed: Mar. 6, 2007

(65) Prior Publication Data
US 2007/0210164 A1    Sep. 13, 2007

Related U.S. Application Data

(60) Provisional application No. 60/779,797, filed on Mar. 7, 2006.

(51) Int. Cl.
| | |
|---|---|
| G06F 7/00 | (2006.01) |
| G06F 17/00 | (2006.01) |
| G06K 7/00 | (2006.01) |
| G06K 19/06 | (2006.01) |
| G05B 19/00 | (2006.01) |
| A01K 5/02 | (2006.01) |

(52) U.S. Cl. ........ 235/491; 235/375; 235/376; 235/385; 340/5.92; 700/215; 700/216; 700/217; 700/218; 705/28; 705/29

(58) Field of Classification Search .......... 235/385, 235/491, 375–376; 705/216, 28–29; 700/215–218; 340/5.92
See application file for complete search history.

(56) References Cited

U.S. PATENT DOCUMENTS
| | | |
|---|---|---|
| 5,194,289 A | 3/1993 | Butland |
| 5,771,657 A | 6/1998 | Lasher et al. |

(Continued)

FOREIGN PATENT DOCUMENTS
| | | |
|---|---|---|
| WO | WO94/16902 A1 | 8/1994 |
| WO | WO/03/104780 A1 | 12/2003 |

OTHER PUBLICATIONS

Kevin M. Conlon, U.S. Appl. No. 10/382,164, filed Mar. 4, 2003 for "Automated Packing System" {device in public use}.

Primary Examiner — Michael G Lee
Assistant Examiner — Laura Gudorf
(74) Attorney, Agent, or Firm — Macheledt Bales LLP

(57) ABSTRACT

An item contents verification system, and associated method, for use in an assembly line of carrier-totes (if used) each containing at least one of a plurality of items having a labeling. Also, a labeling for use with a computerized inspection apparatus for verification of items, and associated method. The system includes: (a) the labeling comprising a luminescent marking and a human-visible indicia; (b) the luminescent marking comprises a coded-indicia generally invisible to a human eye without an irradiation, each of these coded-indicia contains item-information about the item to which the labeling is applied, multiple such coded-indicia will be substantively identical; (c) an inspection apparatus adapted for automatically collecting item-information from luminescent coded-indicia oriented outwardly from items passing in proximity to the inspection apparatus; (d) in communication with the inspection apparatus is a processor unit used for comparing an order of selected items against the item-information collected about all items; if the item-information collected matches the order of selected items, that carrier-tote contents is deemed verified. A reject spur is included to which any respective carrier-tote, or any respective item not matched to an order, is routed if the contents of the carrier-tote is not deemed verified.

34 Claims, 10 Drawing Sheets

U.S. PATENT DOCUMENTS

| | | | | |
|---|---|---|---|---|
| 5,834,706 A * | 11/1998 | Christ | ............................. | 177/1 |
| 6,456,729 B1 * | 9/2002 | Moore | ......................... | 382/103 |
| 7,343,330 B1 * | 3/2008 | Boesjes et al. | ................ | 705/28 |
| 2005/0102203 A1 * | 5/2005 | Keong | ........................ | 705/28 |
| 2005/0123170 A1 * | 6/2005 | Desprez et al. | ............. | 382/101 |
| 2006/0176180 A1 * | 8/2006 | Freund | ..................... | 340/572.8 |

\* cited by examiner

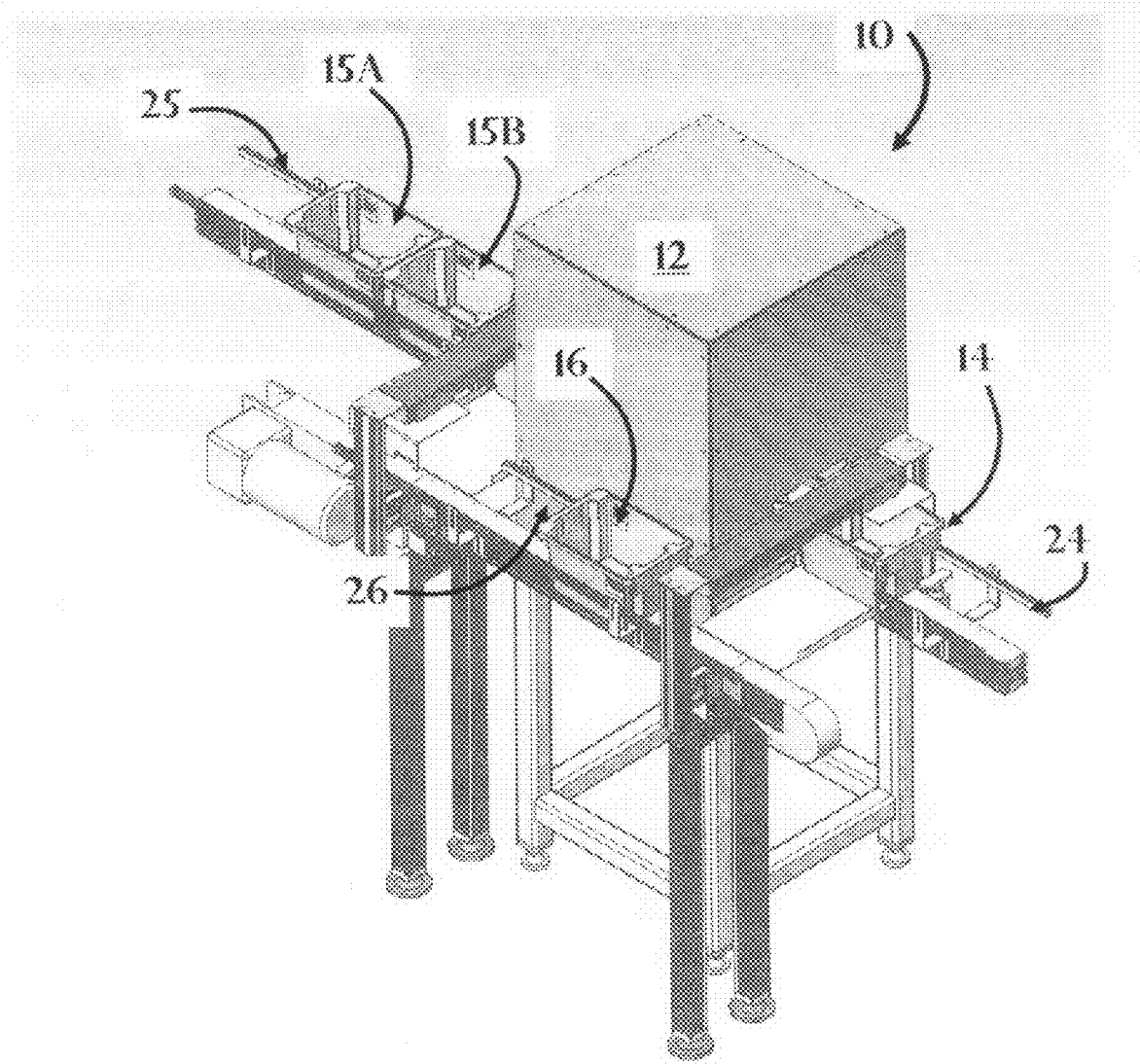

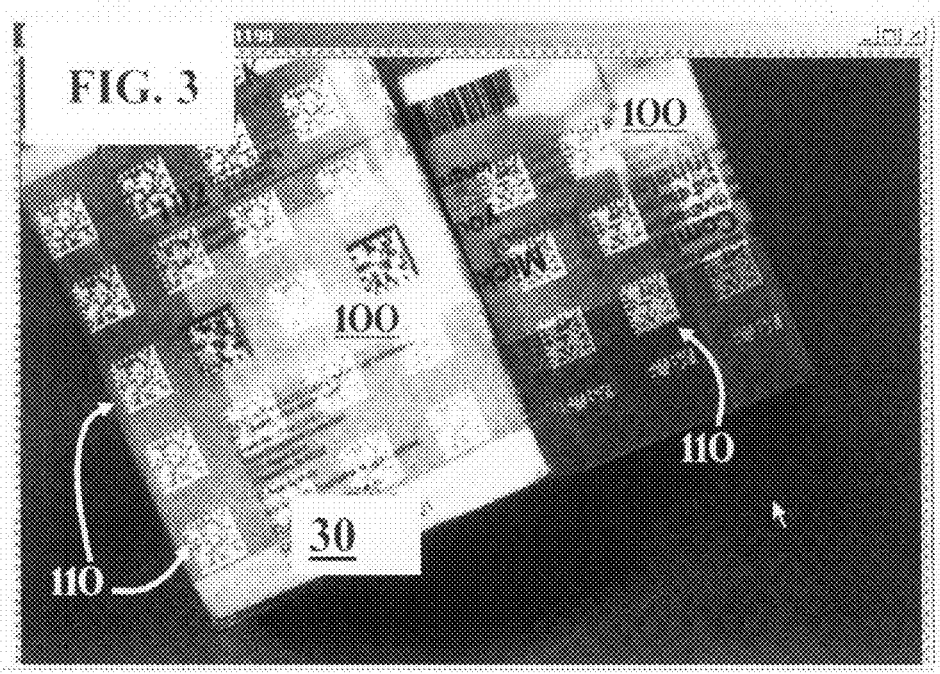
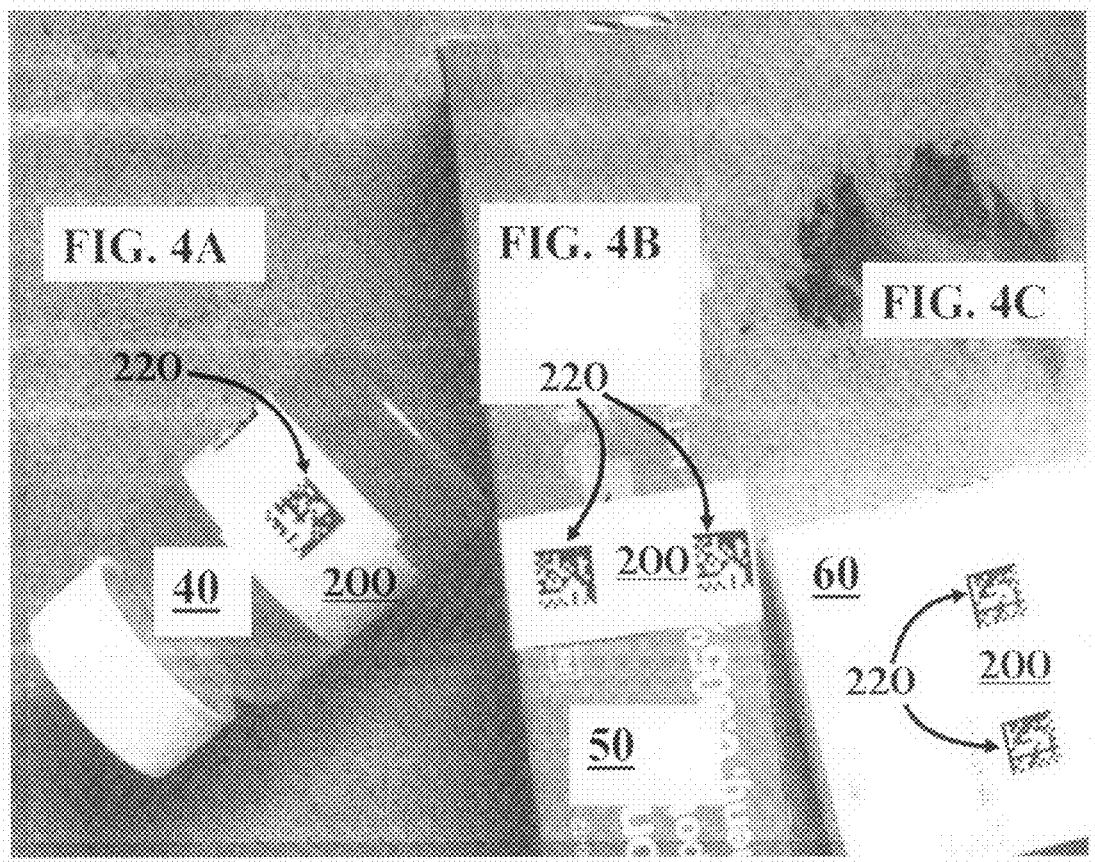

TABLE A

| LABEL NUMBER | NUMBER OF CHARACTERS IN BAR CODE | BAR CODE NUMBER | NUMBER OF BAR CODES PER LABEL |
|---|---|---|---|
| 1 | 16 | 1111111111012301 | 18 |
| 2 | 16 | 1111111111012302 | 18 |
| 3 | 16 | 1111111111012303 | 18 |
| 4 | 16 | 1111111111012304 | 18 |
| 5 | 16 | 1111111111012305 | 18 |
| 6 | 16 | 1111111111012306 | 18 |

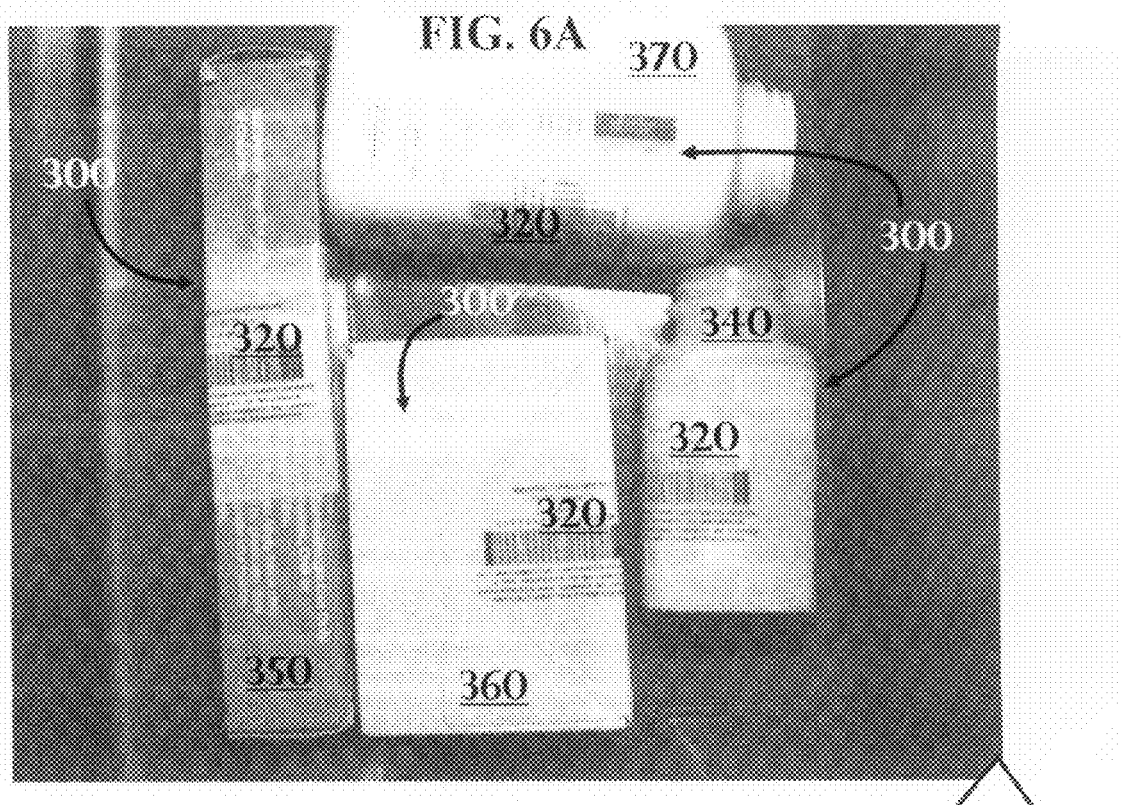
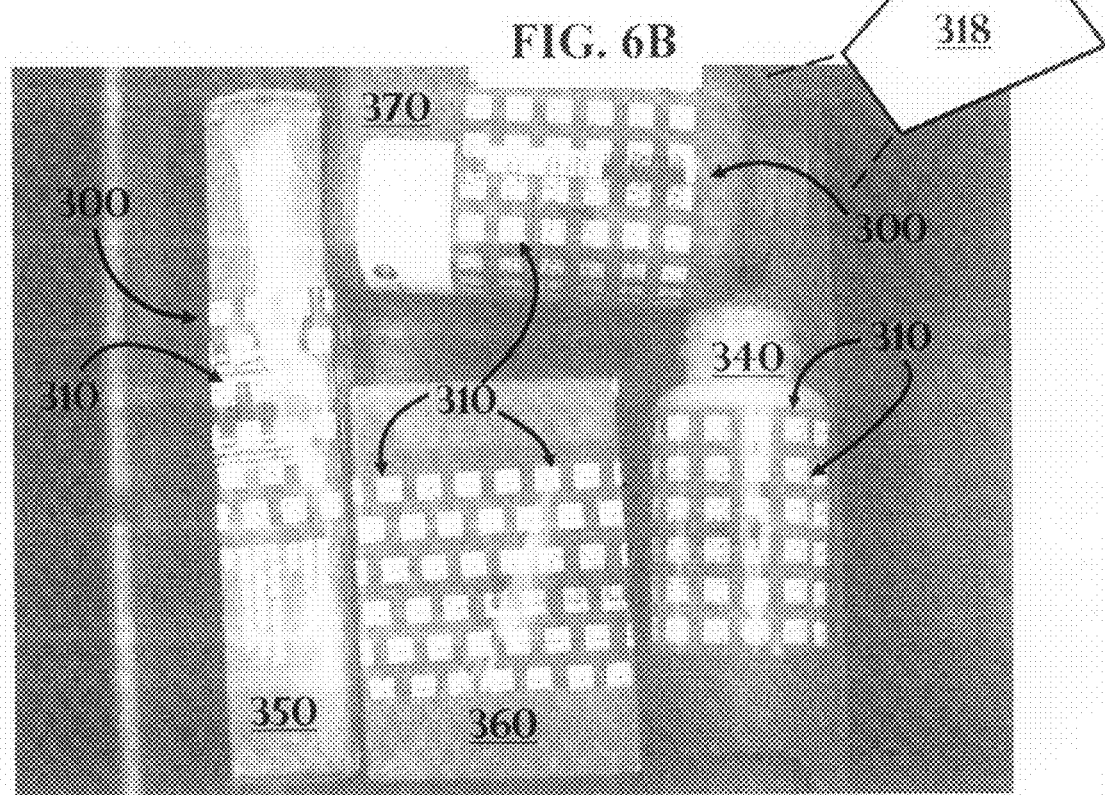

ITEM LABELING, INSPECTION AND VERIFICATION SYSTEM FOR USE IN MANUFACTURING, PACKAGING, PRODUCT SHIPMENT-FULFILLMENT, DISTRIBUTION, OR ON-SITE OPERATIONS

This application claims benefit of pending U.S. provisional patent app No. 60/779,797 filed 7 Mar. 2006 for the applicants on behalf of the assignee hereof.

BACKGROUND OF THE INVENTION

1. Field of the Invention

In general, the present invention relates to systems for identifying and tracking individual product-items or packages traveling through a production, manufacturing, packaging, shipment-fulfillment or distribution assembly line. More-particularly, the invention is directed to a new system and associated unique labeling and new method for automatically labeling for verification and tracking purposes, a plurality of items destined for transport out of the facility within which the assembly line resides. By way of example, each of the plurality of 'items' may include, without limitation, any of a wide variety of one or more similar or different products and the packages/packaging used for containing/clustering together one or more smaller objects, that may benefit from identification through a labeling: 'products' is contemplated to include items such as handheld devices, cell phones, compact disks (CD/DVD/etc.) and other recording/storage media (magnetic and otherwise), as well as books, magazines, newspapers, prepared/packaged foodstuff and other products, produced or manufactured in quantity, whether in assembly line fashion; and 'packages/packaging' used for containing or otherwise clustering together one or more smaller objects for transport is contemplated to include bottles, boxes, packets, pouches, tubes, envelopes, baggies, flexible-wrap, fusion material, cans/canisters, blister-packs, vacuum-formed packs, recording/storage media cases, and other such packaging and containment shapes.

The new system and method for labeling and verifying a plurality of items uses luminescent marking (preferably one that exhibits the phenomenon fluorescence) and a visible indicia (permanent impression visible to a human eye) along with an inspection apparatus for reading/recognition of coded-indicia of the luminescent marking. The luminescent marking, comprising unique symbology, may overlap—at least in part—the visual indicia, forming a unique labeling either directly applied to an item or applied to labeling medium for application to an item. The labeling, in cooperation with the inspection apparatus, provides an item verification tool for assembly line operations (with or without a common carrier/receptacle/tote) or subsequent on-site item verification. Regardless of shape, size, or construction, those items labeled and collected in a common carrier, or tote, are verified by the visual/inspection apparatus, before being deposited into an external shipment container—such as a larger envelope, box, bag, exterior-wrap, tub, and so on—bound for a selected destination.

The luminescent marking is made by applying a dye or ink (such as fluorescent dye, or any of a multitude of materials/compounds that can be applied to a surface of a label medium or item, as mentioned, for subsequent stimulation by irradiation) so that it is generally 'invisible' to the human eye without the aid of IR, UV, or other such radiation. That is to say, this 'invisible' marking preferably creates a permanent impression of indicia that requires stimulation of the dye/ink with radiation (such as visible IR or UV radiation, and so on, depending on the dye/ink) to cause the otherwise 'invisible' indicia to become visible for a machine assisted manual inspection or machine auto-visual inspection. In one aspect, the unique system and method employs a computerized unit to direct and control the auto-application of printed labels to, or auto-application of the labeling directly onto an outwardly facing surface of, items which are consequently loaded into respective totes and moved through an auto-inspection and verification station to reject or accept (i.e., 'clear-the-way') totes for further processing. Note that it is contemplated the labeling may be manually affixed to the items. In a further aspect, the unique labeling (applied to items within assembly line operations) from which item-information is collected and recorded/stored during those operations, can be employed for subsequent on-site item verification once the item(s) reach a respective destination to which they/it were bound after the assembly line operations.

2. General Discussion of Technological Areas (by Way of Background Reference, Only)

Historical Perspective: prior labeling and product tracking systems. Conventional labeling systems, including prior systems owned by the assignee hereof and invented by at least one applicant hereof, typically apply a preprinted label that is either manually or automatically applied to a product or its packaging prior to being released into the fulfillment or distribution process/assembly line. Products or packaging are placed within a tote based upon desired criteria, such as each going to the same end-destination as is shown in U.S. patent application Ser. No. 10/382,164 filed 4 Mar. 2003 for "Automated Packing System" incorporated herein by reference for its detailed technical background discussion of an innovation of one applicant hereof, while obligated under an assignment to the assignee hereof. The products in a tote often require verification and validation, for example, see pp. 25/54-26/54 of application Ser. No. 10/382,164.

Additionally, by way of further background reference only: U.S. Pat. No. 5,771,657 discusses an auto-prescription filling, sorting and packaging system incorporating an assembly line to label bottles into which pills have been dispensed; PCT International application published as No. WO 94/16902 on 4 Aug. 1994 entitled "TECHNIQUE FOR LABELING AN OBJECT FOR ITS IDENTIFICATION AND/OR VERIFICATION" and U.S. Pat. No. 5,194,289 granted 16 Mar. 1993 entitled "METHOD FOR LABELING AN OBJECT FOR ITS VERIFICATION" discuss labeling techniques; PCT International application published as No. WO 03/104780 A1 on 18 Dec. 2003 entitled "LABEL INSPECTION METHOD AND LABEL INSPECTION DEVICE" originating from a Japanese patent application, has an example of a labeling scheme; and radio frequency (RF) identification tags are known to have been adopted for limited use in material tracking and verification.

Typically, product identification labels have an opaque barcode with a 'picket fence' styled identifier commonly referred to as Code 3of9, Code 128 and so on. Where product-items are odd-shaped, or of many shapes, and have no guaranteed orientation at time of being read manually or using an auto-visual apparatus (bottle on its side, for instance), reading a traditionally-coded picket fence identifier at Off angle is difficult. Therefore, any item incorrectly oriented must be re-oriented prior to attempting a reading function.

Selected Definitions, for Background Reference.

Luminescence is light not generated by high temp. alone. Luminescence differs from incandescence, in that luminescence usually occurs at lower temperatures. Examples of luminescence include fluorescence, bioluminescence, and phosphorescence (the latter is a specialized form of photoluminescence—so called 'glow-in-the-dark' substances phosphoresce). Luminescence can be caused by chemical or biochemical changes, electrical energy, subatomic motions, reactions in crystals, or stimulation of an atomic system. The simplest photoluminescent processes are resonant radiations, in which a photon of a particular wavelength is absorbed and an equivalent photon is immediately emitted (involving no significant internal energy transitions); this happens on the order of 10 nanosec. Fluorescence is an effect that occurs when the chemical substrate undergoes internal energy transitions before re-emitting the energy from the absorption event: Some of the original energy is dissipated so that the emitted light is of lower energy than that absorbed. Fluorescence is mostly found as an optical phenomenon in 'cold bodies', in which a molecule absorbs a high-energy photon, and re-emits it as a lower-energy photon with a longer wavelength. The absorbed photon may be in the ultraviolet, with the emitted light in the visible range, but this depends on the absorbance curve and Stokes shift of the particular fluorophore. For example, the mineral fluorite, composed of calcium fluoride, exhibits this phenomenon. The wavelengths that our eye can see, often referred to as visible light or the visible spectrum, are those between ~400-700 nm, which is a small fraction of the vast electromagnetic spectrum of radiation.

Background: Computerized Devices, Memory & Storage Devices/Media.

I. Digital computers. A processor is the set of logic devices/circuitry that responds to and processes instructions to drive a computerized device. The central processing unit (CPU) is considered the computing part of a digital or other type of computerized system. Often referred to simply as a processor, a CPU is made up of the control unit, program sequencer, and an arithmetic logic unit (ALU)—a high-speed circuit that does calculating and comparing. Numbers are transferred from memory into the ALU for calculation, and the results are sent back into memory. Alphanumeric data is sent from memory into the ALU for comparing. The CPUs of a computer may be contained on a single 'chip', often referred to as microprocessors because of their tiny physical size. As is well known, the basic elements of a simple computer include a CPU, clock and main memory; whereas a complete computer system requires the addition of control units, input, output and storage devices, as well as an operating system. The tiny devices referred to as 'microprocessors' typically contain the processing components of a CPU as integrated circuitry, along with associated bus interface. A microcontroller typically incorporates one or more microprocessor, memory, and I/O circuits as an integrated circuit (IC). Computer instruction(s) are used to trigger computations carried out by the CPU. Frequency counters are digital indicating meters for measurement and display of input signals in the form of square wave(s) and pulse(s).

II. Computer Memory and Computer Readable Storage. While the word 'memory' has historically referred to that which is stored temporarily, with storage traditionally used to refer to a semi-permanent or permanent holding place for digital data—such as that entered by a user for holding long term—more-recently, the definitions of these terms have blurred. A non-exhaustive listing of well known computer readable storage device technologies are categorized here for reference: (1) magetic tape technologies; (2) magnetic disk technologies include floppy disk/diskettes, fixed hard disks (often in desktops, laptops, workstations, etc.), (3) solid-state disk (SSD) technology including DRAM and 'flash memory'; and (4) optical disk technology, including magneto-optical disks, PD, CD-ROM, CD-R, CD-RW, DVD-ROM, DVD-R, DVD-RAM, WORM, OROM, holographic, solid state optical disk technology, and so on.

SUMMARY OF THE INVENTION

Briefly described, in one characterization, the invention is directed to aspects of an item contents verification system for use in an assembly line (and if used, a plurality of carrier-totes, each containing at least one of a plurality of labeled items). In another characterization, the invention is directed to aspects of a unique labeling. The system includes: (a) the labeling which comprises a luminescent marking and a human-visible indicia; (b) the luminescent marking comprises a coded-indicia generally invisible to a human eye without an irradiation—and if a plurality thereof is used, each coded-indicia being substantively identical—each of these coded-indicia contains item-information about the item to which the labeling is applied; (c) an inspection apparatus adapted for automatically collecting item-information from luminescent coded-indicia oriented outwardly from items within each carrier-tote as it passes in proximity to the inspection apparatus; (d) in communication with the inspection apparatus is a processor unit used for comparing an order of selected items against the item-information collected about all items within a respective carrier-tote (containing the item); if the item-information collected matches the order of selected items, the respective carrier-tote contents is deemed verified. A reject spur is included to which any of the respective carrier-totes is routed if the contents is not deemed verified.

Also, an item labeling and verification system for use in an assembly line of carrier-totes is characterized. The system includes: (a) an apparatus for automatically applying to each of a plurality of items, a labeling comprising a luminescent marking; this labeling also comprises human-visible indicia; (b) the luminescent marking has a plurality of substantively identical coded-indicia generally invisible to a human eye without an irradiation, each of these coded-indicia contains item-information about the item to which the labeling is applied; (c) a inspection apparatus adapted for collecting the item-information from the luminescent coded-indicia oriented outwardly from items within each carrier-tote as it passes in proximity to the inspection apparatus; and (d) in communication with the inspection apparatus is a processor unit adapted for comparing an order of selected items against the item-information collected about all items within that carrier-tote; if the item-information collected matches said order of selected items, that carrier-tote contents is deemed verified.

In a third characterization, the invention includes an item labeling and verification system for use in an assembly line. The system includes: (a) an apparatus for automatically applying to each of a plurality of items, a labeling comprising a luminescent marking; this labeling also comprises human-visible indicia; (b) the luminescent marking has a plurality of substantively identical coded-indicia generally invisible to a human eye without an irradiation, each of these coded-indicia contains item-information about the item to which the labeling is applied; (c) a computerized inspection apparatus adapted for collecting the item-information from the luminescent coded-indicia oriented outwardly from items as they pass in proximity to the inspection apparatus in the assembly line; and (d) in communication with the inspection apparatus is a processor unit adapted for accessing an order of items associated with the item to which the labeling is applied, and recording the item-information collected for a subsequent verification of the item.

In another aspect the invention includes a labeling for use with a computerized inspection apparatus for verification of items. The labeling includes: (a) a luminescent marking and a human-visible indicia; (b) this luminescent marking comprises a plurality of substantively identical coded-indicia generally invisible to a human eye without an irradiation, each of these coded-indicia to contain item-information about an item to which the labeling is applied; (c) this plurality of coded-indicia being organized in array fashion; and (d) the human-visible indicia comprises a string of alphanumeric characters to identify the item to which the labeling is applied. The inspection apparatus includes: (a) a source of radiation emitted for collection of the item-information; and (b) a device adapted to capture the coded-indicia when illuminated by this source of radiation.

In, yet another aspect, the invention includes a method of labeling items for verification of contents within each of a plurality of carrier-totes in an assembly line. The method includes the steps: (a) applying a labeling to each of a plurality of items comprising automatically applying a luminescent marking; this labeling further comprising a human-visible indicia; (b) the luminescent marking comprising a plurality of substantively identical coded-indicia, generally invisible to a human eye without an irradiation, that contains item-information about the item to which the labeling is applied; (c) collecting the item-information from the luminescent coded-indicia oriented outwardly of items within each carrier-tote as it passes in proximity to an inspection apparatus; and (d) comparing an order of selected items against the item-information collected about each of the items within the carrier-tote; if the item-information collected matches the order of selected items, the respective carrier-tote contents is deemed verified; and if the item-information collected does not match the order of selected items, the respective carrier-tote is routed to a reject spur.

In another characterization of the method, the invention includes a method of labeling items for verification thereof. The steps of this method include: (a) applying a labeling to each of a plurality of items comprising automatically applying a luminescent marking; this labeling further comprising a human-visible indicia; (b) the luminescent marking comprising a plurality of substantively identical coded-indicia, generally invisible to a human eye without an irradiation, that contains item-information about the item to which the labeling is applied; (c) using a computerized inspection apparatus within an assembly line through which the plurality of items are passed, automatically collecting and recording the item-information from the luminescent coded-indicia; and (d) using a second inspection apparatus at a subsequent time, recollecting item-information from the luminescent coded-indicia and comparing the recollected item-information against a database of a plurality of the item-information collected and recorded earlier, for the verification.

The system, method and labeling may reduce labor costs required to handle and inspect each individual packages, products, and other such items during assembly line operations. The system, method and labeling may reduce human error in verification operations within an assembly line. The system, method and labeling can be used as a material tracking system If governmental agency, such as the Food & Drug Administration (FDA), requires validation prior to prescription drug packaging, for example, the system, method and labeling may be combined with other assembly line technology of the assignee hereof for a larger production/distribution/shipment fulfillment solution.

Certain combinations of features depicted throughout may have one or more advantage, such as:

Ability to label an item while maintaining ability to still 'read' (characters viewable) the product packaging indicia (or other labels) underneath the labeling.

Ability to provide more than one different identifier-type, to a single item.

Ability to provide non-human readable codes/ing containing additional security identifier so that once the item reaches a destination, it can be inspected for an on-site verification (e.g., is it a legal, purchased, licensed copy, or not?) with irradiation using a source emitting at the correct pre-selected ('target') frequency range.

Ability to operate in compliance of a variety of national and international regulations governing labeling, such as FDA and HIPPA, for prescription and non-prescription drug distribution, as well as distribution of supplements, cosmetics, and other such items ingested or applied to a human or other animal, as regulated.

Ability to verify items oriented in a variety of ways/different orientation within a tote, or not, moving along an assembly line.

BRIEF DESCRIPTION OF DRAWINGS

For purposes of illustrating the innovative nature plus the flexibility of design and versatility of the new system and associated technique set forth herein, the following background references and figures are included. One can readily appreciate the advantages as well as novel features that distinguish the instant invention from conventional labeling systems and techniques. The figures as well as the incorporated technical materials have been included to communicate the features of applicants' innovative device and technique by way of example, only, and are in no way intended to limit the disclosure hereof. Each enclosure, identified and labeled an ATTACHMENT, is hereby incorporated herein by reference for purposes of providing background technical information and state of the art.

FIG. 1 is an isometric representing verification operations 10 within an assembly line that incorporates use of totes to move smaller items, through the operations.

FIG. 3 is a digital photo of the labeling on two items (30) illuminated with an irradiation such that the luminescent coded-indicia 110 of labeling 100, can be viewed.

FIGS. 4A-4C are digital photos of labeling on three differently-shaped items (respectively, 40, 50, and 60) illuminated with an irradiation such that the luminescent coded-indicia 220 of each labeling 200, can be viewed.

Figure 5A:
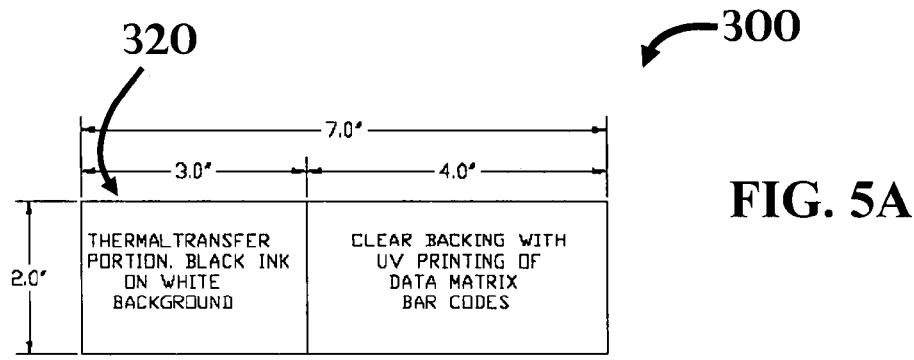
FIGS. 5A-5B are schematics representing alternative labeling 300 having a human-visible portion 320 and a matrix of coded-indicia 310—all atop either a labeling medium as indicated in the figures, or directly applied to an item. The coded-indicia may be comprised of a wide variety of substantively different or substantively similar encoded indicia.
Figure 5B:
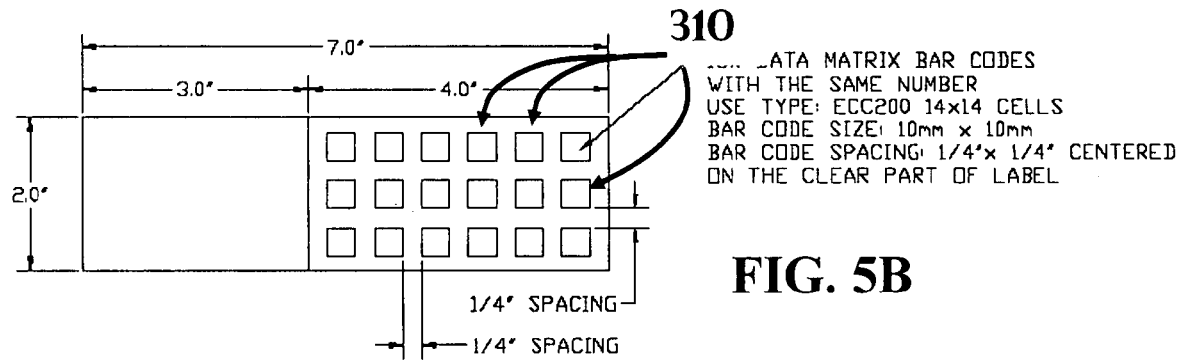

Table A, located below FIGS. 5A-5B, maps out one possible configuration of encodings of the item-information contained in coded-indicia 310.

FIGS. 6A-6B are digital photos of labeling on four differently-shaped items (respectively, 340, 350, 360, 370) shown in FIG. 6B illuminated with an irradiation, the source of which is 318, such that the luminescent coded-indicia 310 of each labeling 300, can be viewed.

Figure 7A:
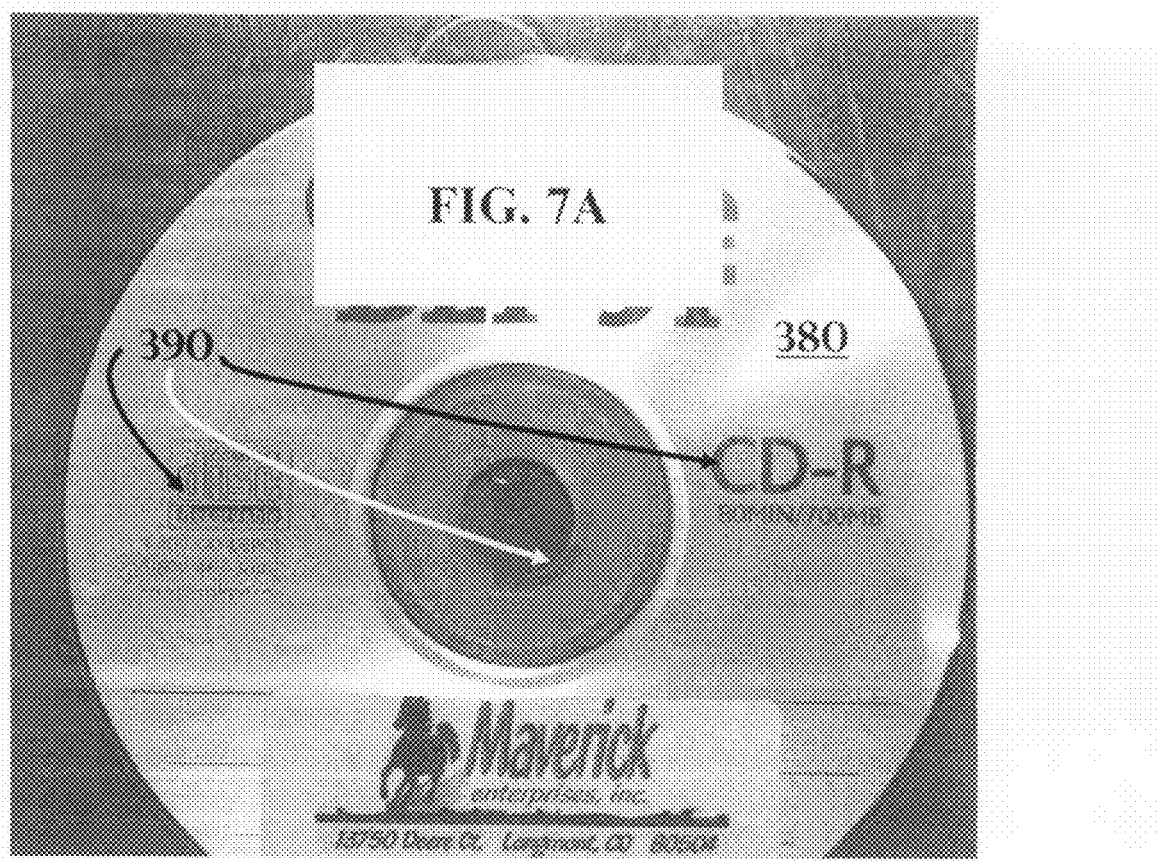
Figure 7B:
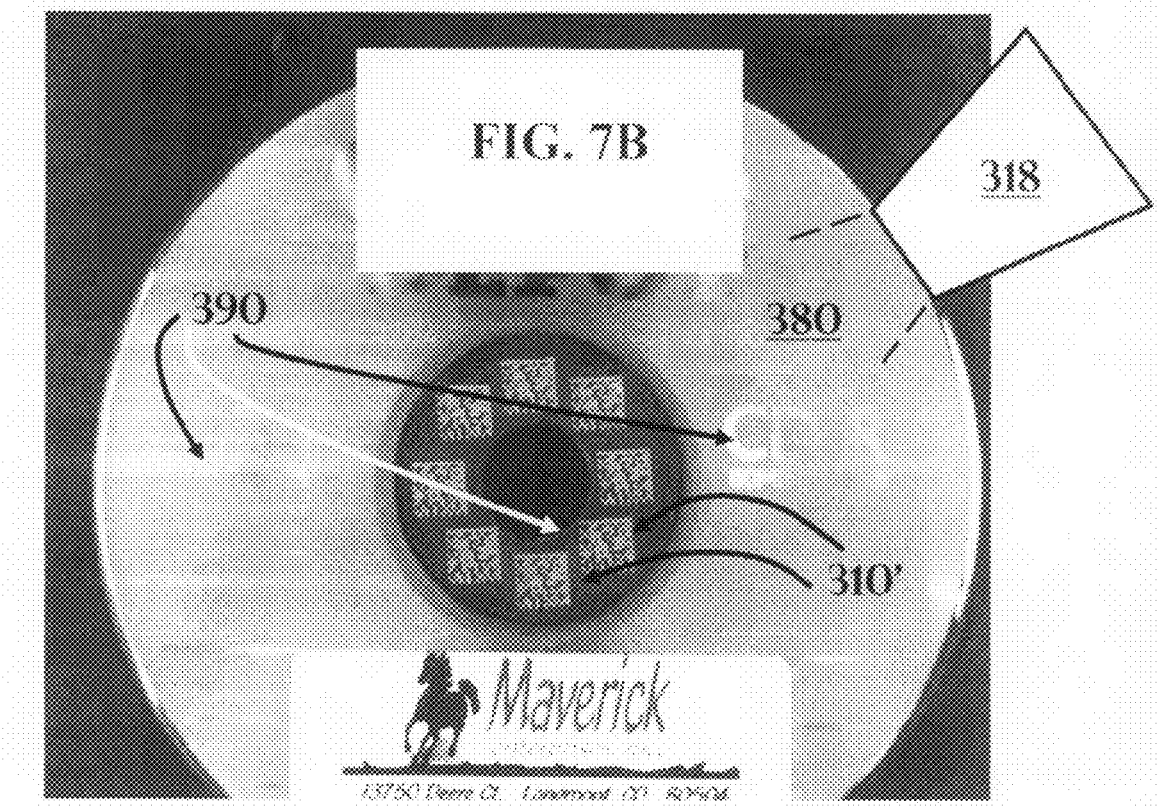

FIGS. 7A-7B are digital photos of labeling on an optical disk 380 shown in FIG. 7B illuminated with an irradiation, the source of which is 318, such that the luminescent coded-indicia 310' of the labeling on item 380, can be viewed.

Figure 8:
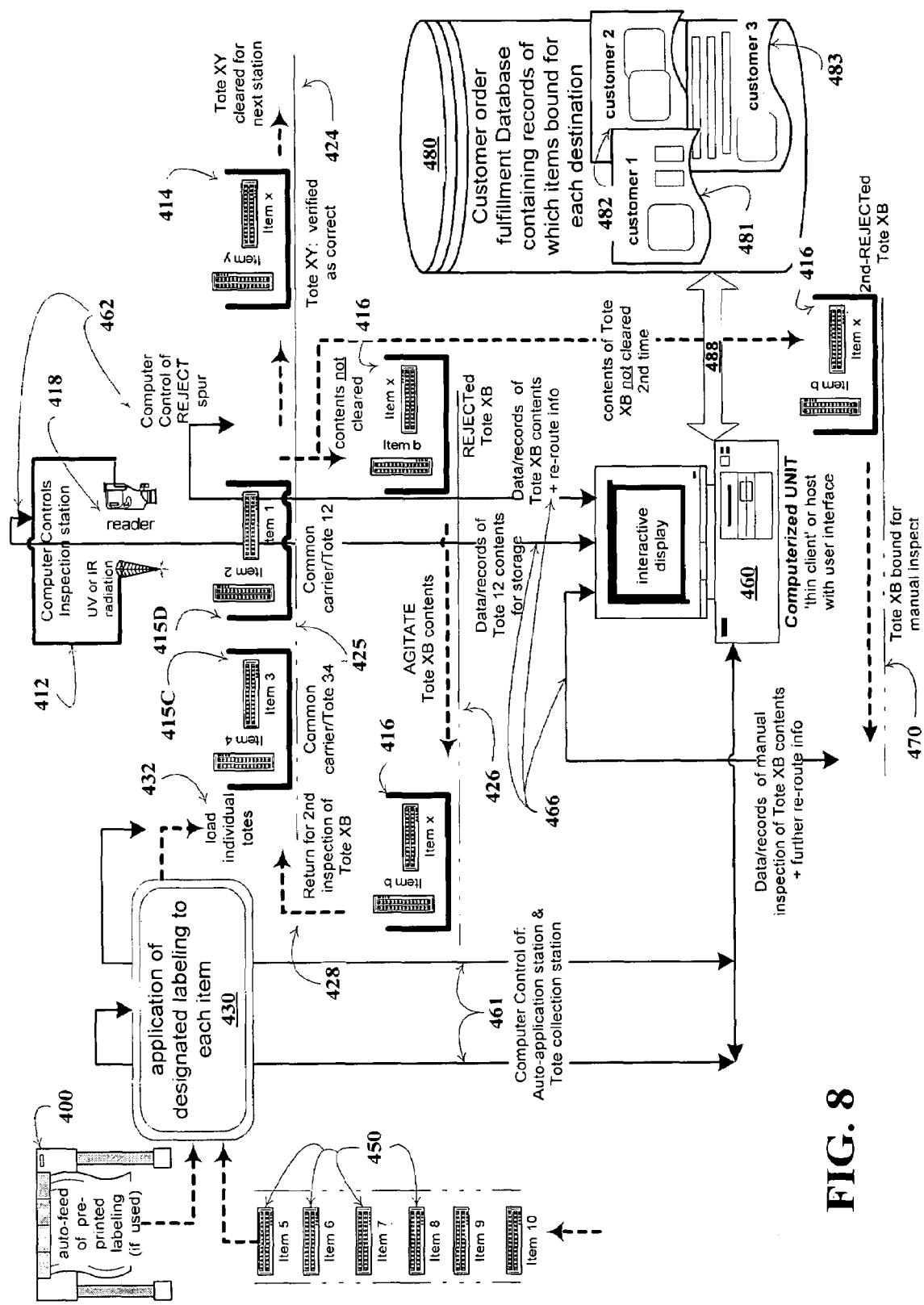

FIG. 8 is a high-level schematic, not to scale, depicting operation, communication and functionalities of various elements of a preferred embodiment of the system and method of labeling items for verification of contents within each of several totes in an assembly line.

Figure 9:
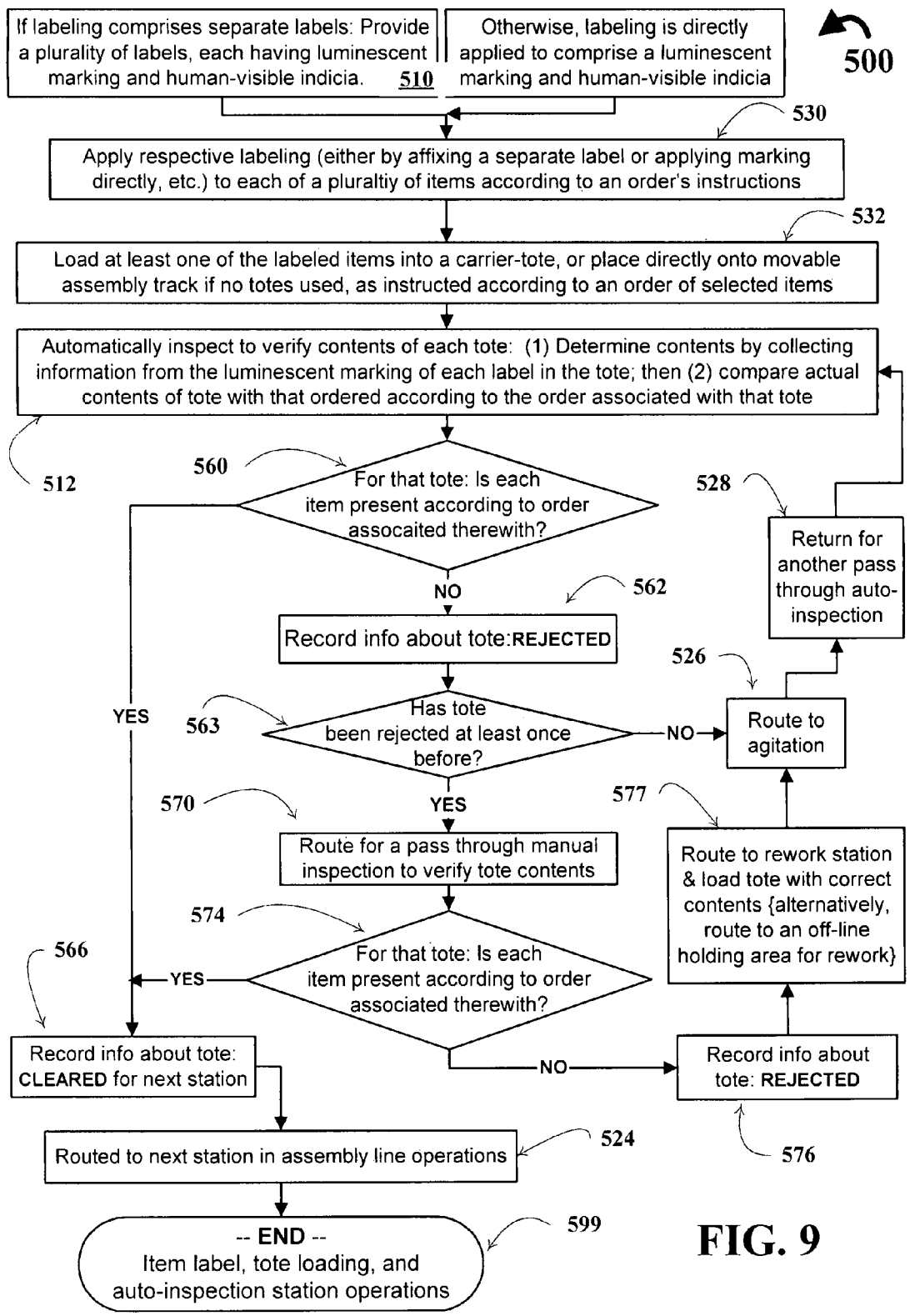

FIG. 9 is a flow diagram depicting details of a method 500—illustrated are core, as well as further distinguishing/additional, features of the invention for labeling and verification of items such as those represented and/or depicted in FIGS. 3, 4A-C, 5A-B, 6A-B, 7A-B, and 8.

Figure 10:
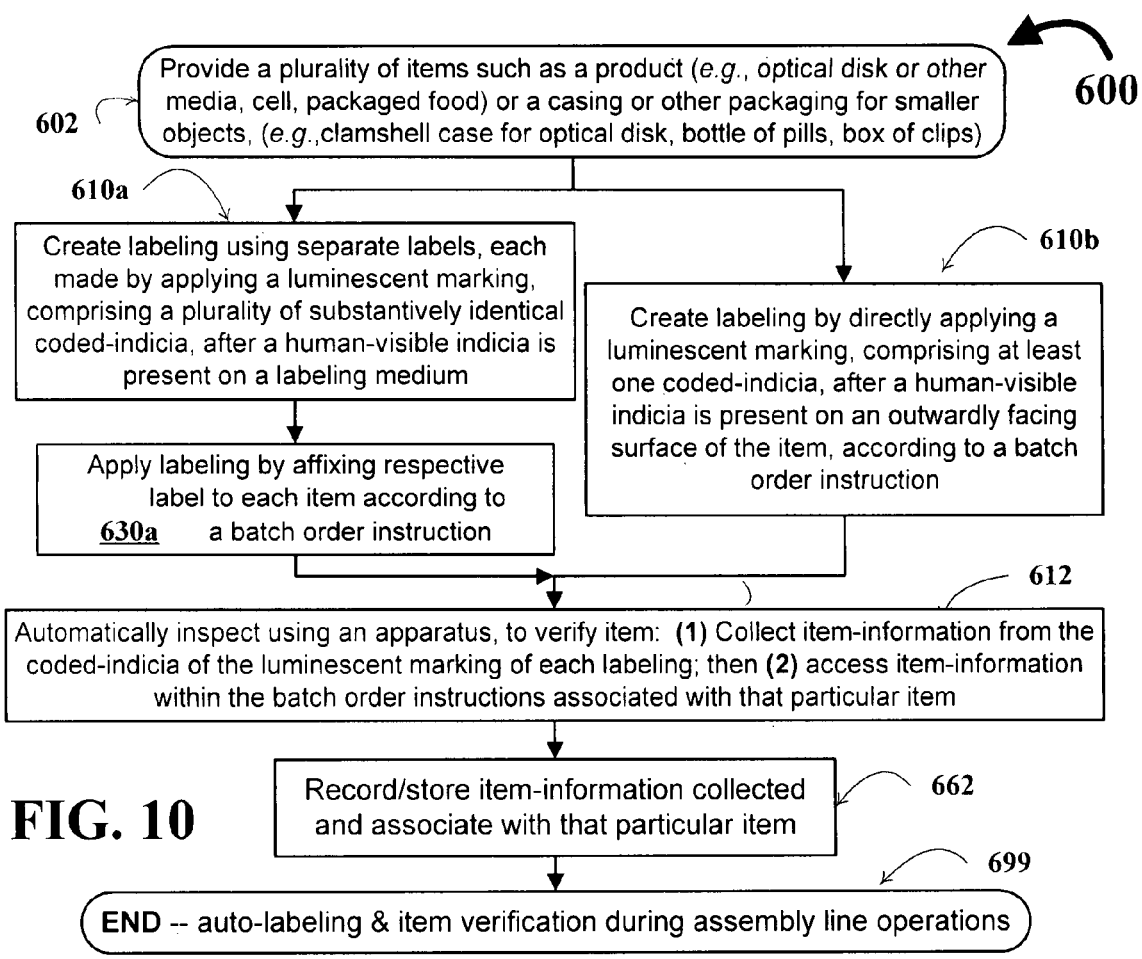
Figure 11:
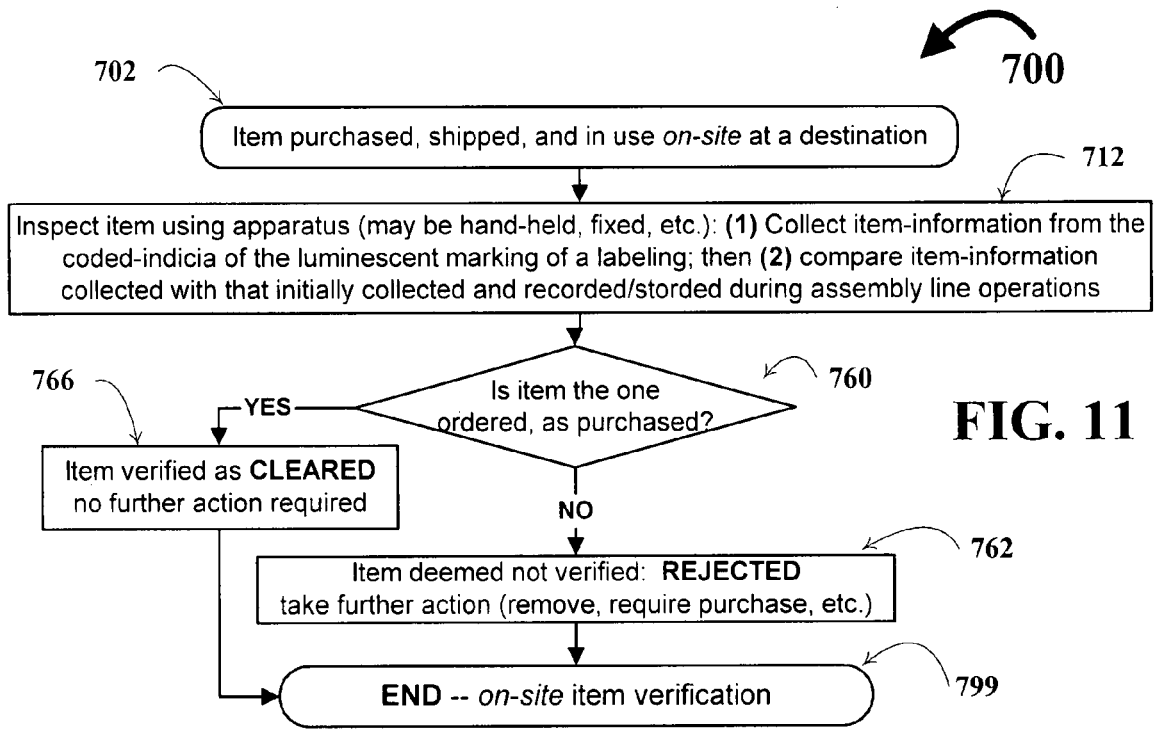

FIGS. 10 and 11 are flow diagrams depicting details of methods labeled, respectively 600, 700—illustrated are core, as well as further distinguishing/additional, features of the invention for labeling and verification of items such as those represented and/or depicted in FIGS. 3, 4A-C, 5A-B, 6A-B, 7A-B, 8, 12.

Figure 12:
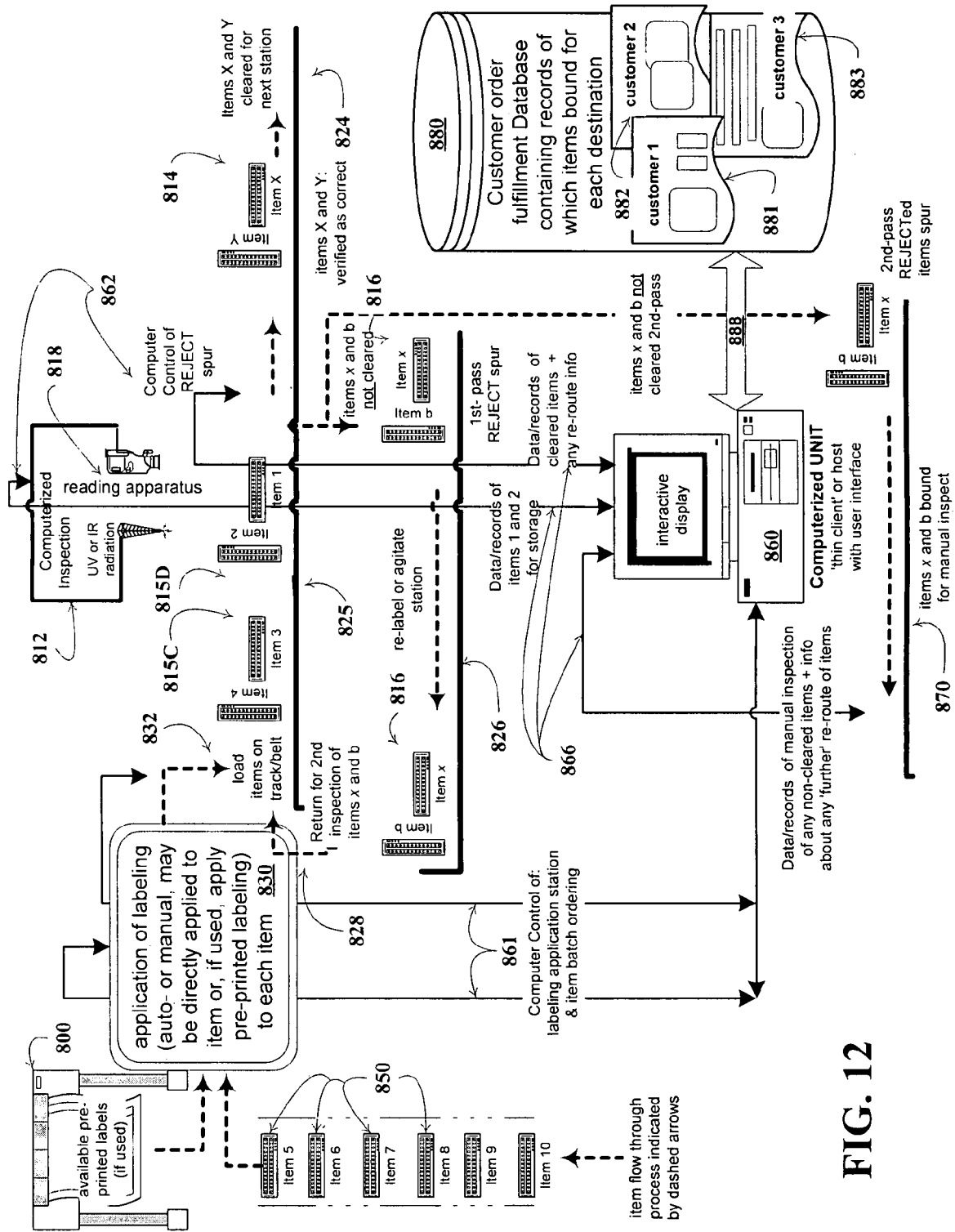

FIG. 12 is a high-level schematic, not to scale, depicting operation, communication and functionalities of various elements of an alternate embodiment of the system and method of labeling items for verification thereof along an assembly line.

DESCRIPTION DETAILING FEATURES OF THE INVENTION

By viewing the figures which depict associated representative structural embodiments, along with the technical materials outlined in the ATTACHMENTS, one can further appreciate the unique nature of core as well as additional and alternative features of the new labeling, labeling system, and associated technique. Back-and-forth reference will be made to the various drawings—especially the schematics of FIGS. 5A-B, and 8 and flow diagrams of FIGS. 9-11 which detail core and additional features of the system and method—to associate respective features for a better appreciation of the unique nature of the labeling, system, and method.

U.S. patent application Ser. No. 10/382,164 filed 4 Mar. 2003 for "Automated Packing System" incorporated herein by reference for its detailed background technical discussion of an automated packing system innovation of one applicant hereof, while obligated under an assignment to the assignee hereof.

Figure 2A:
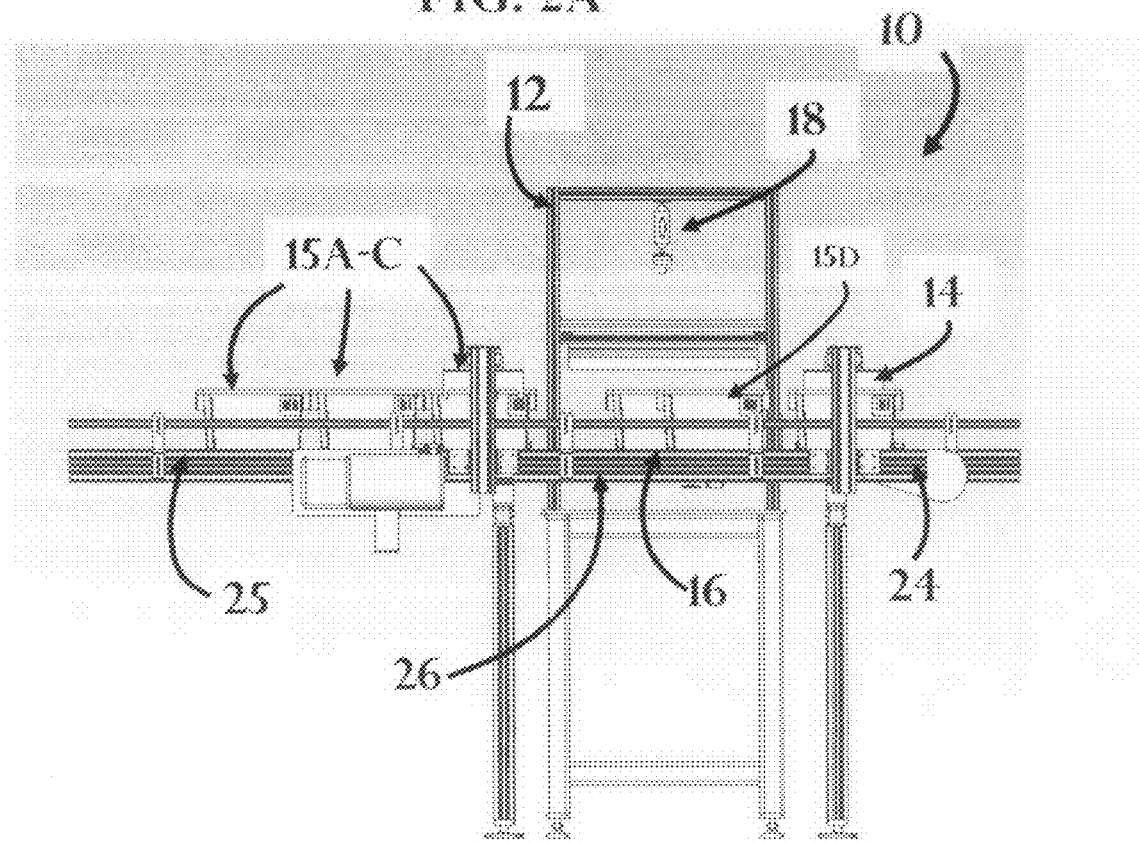
FIG. 2A is a side plan view of the verification operations 10 depicted in FIG. 1, with the covering 12 over the inspection apparatus removed.
Figure 2B:
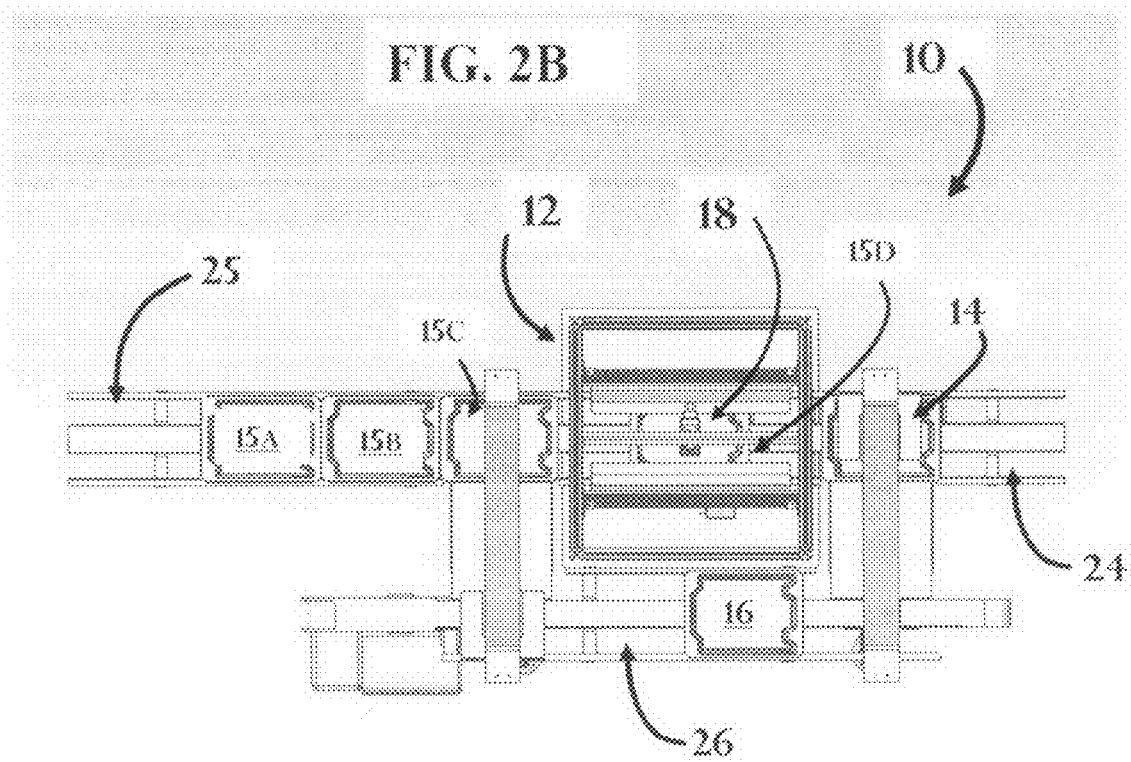
FIG. 2B is a top plan view of the verification operations 10 depicted in FIG. 1, with the covering 12 over the inspection apparatus removed.

The FIG. 1 isometric represents verification operations 10 within an assembly line that incorporates use of carrier-totes such as those labeled 14, 16, and 15A-D (15D beneath inspection apparatus 18, FIGS. 2A-2B) to move smaller items contained therein, through the operations. Use of such carriers maintains proximity of item(s) bound for a particular destination, providing a mechanism for handling each item grouping, downstream. FIG. 2A is a side plan view, and FIG. 2B is a top plan view, of verification operations 10 with the covering 12 over inspection apparatus 18 removed. In connection with FIGS. 1 and 2A-2B, turn to the FIG. 8 high-level schematic depicting additional functionalities of various elements of a preferred embodiment of the system and method of labeling items for verification of contents within each of several totes in an assembly line (noting that the FIG. 12 high-level schematic depicts an alternate assembly line, without totes). Carrier-tote 14 moves over track 24 prior to entering into the area 12 within which inspection apparatus 18 is located. Those totes for which the correct number and type of items is not matched with an order of selected items (see also FIG. 9 at 560, 562) are routed into a reject spur (526, FIG. 9)—such as track 26 atop which tote 16 is shown—since contents is not deemed verified. As shown, totes 15A-C atop track 25 represent totes for which the item-information collected from each labeling of items contained within the tote matches a respective order of selected items (560 to 566, FIG. 9): Contents for totes 15A-C is deemed verified and each is cleared to move on to next station in the line (524, FIG. 9).

Rejected totes, such as tote 16, are returned to track 24 (528, FIG. 9) for reentry and inspection by the inspection apparatus 18 (via additional track not shown, for simplicity). In the event tote 16 contents is, once again, rejected for some reason (563, 570, FIG. 9), the tote may be routed to a manual inspection area, which might be off-line, for rework to be done (577, FIG. 9) to bring the tote contents into compliance to match its respective order of selected items. As further shown in FIG. 9 flow diagram of process 500, reworked totes (577) can be routed through a tote agitation station (526) and returned for another pass through inspection (528) under inspection apparatus 18 (see, also, FIGS. 2A-2B). Where no tote is used, re-labeling and/or agitation station along track 826, FIG. 12 may be employed prior to return (828, FIG. 12) for a $2^{nd}$ inspection.

The novel labeling can take a variety of forms. The next several figures are exemplary of this, as one will appreciate. FIG. 3 depicts the labeling on two items (30) illuminated with an irradiation such that the luminescent coded-indicia, or symbology, 110 of the labeling 100, can be viewed; FIGS. 4A-4C show labeling on three differently-shaped items (respectively, the packaging is labeled 40, 50, 60) illuminated with an irradiation such that the luminescent coded-indicia, or symbology, 220 of each labeling 200, can be viewed. The use of at least a couple coded-indicia 220 on each item increases likelihood of a successful reading of that item moving by a inspection apparatus (18, FIG. 2A-B). FIGS. 5A-5B schematically represent an alternative labeling 300 having a human-visible portion 320 and a matrix of coded-indicia 310—all atop either a labeling medium as indicated in the figures, or directly applied to an item. The coded-indicia 310 may be comprised of a wide variety of different or similar encoded indicia, such as: several pairs of substantively identical barcodes, several triples of substantively identical barcodes, a pair of substantively identical barcodes along with several different barcodes, and so on. Table A, located below FIGS. 5A-5B, maps out one possible configuration of encodings of the item-information contained in coded-indicia 310.

The new labeling applied to an item consists of the combination of an 'invisible' marking which creates a permanent impression of indicia perceptible in the presence of UV or IR radiation, overlapping a permanent impression that is visible to a human eye. The invisible marking is preferably made of a dye/ink, or other coating or material that will fluoresce under the influence of directed radiation (such as energy found within UV and IR wavelength ranges). Any convenient stamp, screen, inkjet or laser-jet, and other such imprinting implements may be utilized to apply a variety of forms of marks or indicia, or symbology, including a digitized code/coding (such as a bar code), alphanumeric characters (whether in a language that an operator can understand, or coded such that a look-up table is employed to decipher the code), and so on, to an outer-facing surface of the label for subsequent application to each item. A UV 'black light'—or other suitable radiation source—can be selected for illumination. Further, it is contemplated that the luminescent marking may be composed of customer-dedicated symbology such that, in order to collect item-information, irradiation is done at inspection (412 in FIG. 8, 512 in FIG. 9, 612 in FIG. 10, 712 in FIG. 11, and 812 in FIG. 12) using a source operating within a dedicated pre-selected ('target') frequency range for that customer. This provides an added security feature within the labeling so that a 'foreign' inspection apparatus is unable to correctly identify the item-information. As suggested elsewhere herein, a wide variety of labeling media may be employed (atop which unique luminescent symbology is applied), whether clear or opaque: paper, thermal transfer, 'direct thermal transfer' (here, the medium is composed of layers adhered thermally or otherwise, e.g., by an adhesive or use of a coating, to maintain structural integrity), polymer materials ('plastics'), metal, and so on. In the case of utilizing known 'direct thermal transfer' technology: another layer comprising the luminescent coded-indicia, or symbology, is incorporated beneath the outer protective coating to create the novel labeling contemplated hereby. Collection of information from a laminated labeling produced using, for example, direct thermal transfer technology is then done via suitable inspection apparatus (e.g., 18 in FIG. 2B, 418 in FIG. 8, and 812 in FIG. 12).

For present purposes, permanent impression as used herein is one that is generally incapable of being removed in the ordinary course of intended handling and usage of the item for a time adequate for identification and/or verification thereof to occur during the assembly line operations. Permanent impression as used in connection with the visible portion of the labeling preferably extends to include the time any smaller objects (e.g., pills, liquid medicine, in the case of a pharmaceutical use, or any other small object) contained within a package-item—or in the case of an item-product (e.g., compact disk/CD, or other storage media, etc.), until the product is selected by a user for use or consumption—so that the item is identifiable by an end-user. For certain items, it may be such that both the visible indicia as well as the 'invisible' indicia portion remain affixed and identifiable in presence of UV or IR radiation for a designated shelf-life period; for example, if the items will sit in storage after labeling is applied but before being introduced or reintroduced (at a later date) into the assembly line operations for collection and verification. Thus, such a label preferably has a permanent impression of 'invisible' indicia that will last an extended period of time, say several weeks to several months, for reading and verification (at a later date) while undergoing assembly line operations. The labeling medium on which a permanent impression of indicia is made is selected from a wide variety of clear or opaque labeling materials.

FIGS. 6A-6B depict the labeling on four differently-shaped items (respectively, the packaging is labeled 340, 350, 360, 370) shown in FIG. 6B illuminated with an irradiation, the source of which is represented at 318, such that the luminescent coded-indicia 310 of each labeling 300, can be viewed. The human-visible portion 320 of each labeling 300 includes a UPC code and alphanumeric characters recognizable by a human reading the label. As shown in FIGS. 6A-6B, luminescent marking comprising coded indicia 310 is permanently impressed over the human-visible portion of the labeling. If the human-visible indicia 320 is imprinted directly on the item 340, 350, 360, 370 and the luminescent marking is imprinted/applied to a clear label medium, the label medium may be directly applied over the human-visible indicia. Since the luminescent marking will not be visible to a human without irradiation 318, a user of the items will not be hindered in viewing what the packaging contents is, say at home when taking a medication contained within the packaging, unless the item is irradiated. Similarly, in FIGS. 7A-7B the item, here an optical disk 380, has human-visible indicia 390 and luminescent marking coded-indicia 310', shown and viewable in FIG. 7B because it has been illuminated with an irradiation, the source of which is labeled 318.

In summary fashion at a high-level, the schematic FIG. 8 and flow diagrams FIGS. 9-11 depict certain core, as well as additional, further distinguishing features of the system and method of labeling and verification according to the invention (having selected capabilities and functionalities). FIG. 8 depicts operation, communication and functionalities of various elements of a preferred embodiment of the system and method of labeling items for verification of contents within each of several totes traveling/moving along an assembly line; likewise, FIG. 12 depicts operation, communication and functionalities of various elements without use of totes/carriers. FIGS. 9-11 are flow diagrams depicting details of associated methods 500, 600, and 700.

Items (shown collectively at 450) that have been traveling along an assembly track, or stacked in suitable storage shelving or bins, etc., are paired-up with respective labeling at 400, which can be from an auto-feed device. In the case where the labeling is permanently applied directly to an item 450, the device labeled 400 in FIG. 8 represents ink/dye jet printers, such as are known to provide markings in human-visible ink/dye and luminescent marking dyes. See, also, FIG. 9 at 510, 530 and FIG. 10 610*a*, 610*b*, and 630*a*. At station 430 labeling is preferably automatically applied—whether the marking is directly applied to an item or to a preprinted label medium applied to the item—based on information/data received from suitable computerized unit 460. Computerized unit 460 may be a host computer (PC, workstation, mainframe, etc.), thin client, and so on, with sufficient storage and processing capacity and suitable user interface for assembly line operators to control and monitor the operations. Totes are loaded with respective items at 432 (see also FIG. 9, 532) according to orders 481, 482, 483 having been placed by or for customers of selected items bound for designated destinations and stored 480 for access 488 by unit 460, to in turn control 461 the labeling 430 and tote loading/collection 432 functionalities. Orders 481, 482, 483 sent from several different ordering facilities—e.g. wide area network—are collectively stored in a Customer Order Fulfillment Database 480 (see also FIG. 9, 532).

Carrier-totes are shown at several different stages moving through the assembly line: Tote 34 (415C) containing items 3 and 4 is traveling incoming track 425; Tote 12 (415D) containing items 1 and 2 and is undergoing inspection 412 utilizing a camera/reader 418 and radiation source, either UV, IR, etc. based on luminescent marking dye/ink used; Tote XB (416) contains items x and b, the contents of which has been rejected and moved through reject spur track 426 for agitation and return 428 for a $2^{nd}$ inspection; and Tote XY (414) containing verified contents items X and Y, has been cleared (566, FIG. 9) and is moving along track 424 (524, FIG. 9). Computerized unit 460 is in communication to receive (466) and record information collected by inspection apparatus 418 at inspection station 412, as well as receive and record information about any rejected tote, such as, what actual contents of Tote XB is and where this tote is being rerouted—both for the first (562, FIG. 9) and second rejection (576, FIG. 9) along track 470 to rework (577, 526, FIG. 9).

Many steps identified in flow diagrams FIGS. 9-11, are referenced elsewhere herein. Jumping, next, to the inspection stage 412 (see also, 512 in FIG. 9, 612 in FIG. 10, 712 in FIG. 11, and 812 in FIG. 12): whether items are moved through the line in a tote, contents information is collected from the luminescent marking of each labeling outwardly facing from each item (whether in a tote) as it passes in proximity to inspection apparatus 418 (see also, 818 in FIG. 12, 318 in FIGS. 6A-B, 7A-B, and 18 in FIGS. 2A-B). The duplicity of coded-indicia 110, 220, 310, 310' within a luminescent marking, increases the likelihood that at least one coded-indicia will be read upon illumination by a radiation source, to collect the item-information for recording (562, 576, 566, FIG. 9; 662, FIG. 10; 762, FIG. 11) and comparing with an order of items—whether the comparing is done against an order of selected items associated with a respective tote passing along (e.g., 512), or an order of selected items for a batch of items, say DVD's, CD's, cell phones, individual bottles/cans/containers (e.g., 815C, 815D, 814, in FIG. 12) traveling along the line (e.g., 825, 826, 824 in FIG. 12), from which item-information is collected for verification at that time within the assembly line (e.g., 612) or for a subsequent verification on-site after purchase (e.g., 712), and so on.

Turning now to FIG. 12: items (shown collectively at 850) that have been traveling along an assembly track, or stacked in suitable storage shelving or bins, etc., are paired-up with respective labeling 800, which may be from an auto-feed device. In the case where the labeling is permanently applied directly to each of the items 850, the component labeled 800 in FIG. 12 represents ink/dye jet printers, such as are known to provide markings in human-visible ink/dye and luminescent marking dyes. See, also, FIG. 9 at 510, 530 and FIG. 10 610a, 610b, and 630a. At station 830 labeling is preferably automatically applied—whether the marking is directly applied to an item or to a preprinted label medium applied to the item—based on information/data received from suitable computerized unit 860. As mentioned, computerized unit 860 may be a host computer, thin client, and so on, with sufficient storage and processing capacity and suitable user interface for assembly line operators to control and monitor the operations. Respective items are placed on the line at 832 (see also FIG. 9, 532) according to orders 881, 882, 883 having been placed by or for customers of selected items bound for designated destinations and stored 880 for later access 888 by unit 860, to in turn control 861 the labeling 830 and item loading 832 functionalities. Orders 881, 882, 883 sent from several different ordering facilities—e.g. wide area network—are collectively stored in a Customer Order Fulfillment Database 880 (see also FIG. 9, 532).

Items are shown at several different stages moving through the assembly line: items 3 and 4 are traveling along incoming track 825 (at 815C); items 1 and 2 (along the track at 815D) are undergoing inspection 812 (preferably comprising camera/reading device 818 and radiation source, either UV, IR, etc. based on luminescent marking dye/ink used); labeling on items x and b has been rejected (at 816) and moved through computer-controlled/computerized reject spur 862 for re-labeling and/or agitation (passing along reject spur track/line 826) and return 828 for a $2^{nd}$ inspection; and items X and Y (at 814) for which labeling has been verified, are cleared (566, FIG. 9) and are moving along track 824 (524, FIG. 9). Computerized unit 860 is in communication to receive (866) and record information collected by apparatus 818 at inspection station 812, as well as to receive and record information about any rejected item labeling, such as, 'where is the rejected item to be rerouted?'—both for a first-pass rejection (562, FIG. 9) and second-pass rejection (576, FIG. 9) along track 870 to rework (577, 526, FIG. 9).

EXAMPLE 1

Labeling is created by imprinting a $1^{st}$ barcode using human-visible ink/dye, say, in an easy to view opaque color, such as black, dark blue, dark red, dark green, and so on. A $2^{nd}$ luminescent marking is imprinted as two-dimensional array of coded-indicia using ultraviolet (UV) dye. The label may extend around the product, itself, or packaging of other smaller objects (e.g., pills, liquid medicine, storage media, paper clips, and so on) so that at least one UV coded-indicia is visible when excited with a black light source and viewed using a common reader from any angle. The item can be any product or packaging to which the unique labeling can be applied such as but not limited to the following: boxes, pouches, cylindrical shaped items, rectangle shaped items, bottles, tubes, blister packs or vacuum formed packages.

Once the labeling has been applied, items may be loaded/collected into a common carrier-tote that may be processed though an assembly line by way of a conveyer under automatic computer control. The conveyer is provided with various sensors and other system means to allow it to proceed from the labeling station to the inspection and verification station. Once the carrier-tote is at the inspection and verification station, an inspection apparatus takes a 'snapshot' of the contents of the inside of the common carrier. The inspection apparatus is equipped with a camera and an illumination source for reading the UV barcoded-indicia printed on the item, from any angle. Once item-information is read/collected from each item within the tote (by included duplicate coded-indicia wrapped around the surface, or a couple of surfaces of each item, likelihood of capture of at least one coded-indicia increases, decreasing the chance of a false reading or not reading coded-indicia from every item in the tote), the inspection system submits the readings to the host computer.

The processor of the host compares the item-information collected from each item with a database of orders and confirms, or verifies, the contents of the tote if all items are present and correct. If contents of the tote is confirmed as verified, the tote will then proceed to packaging, shipping or a next operation. If tote contents is not confirmed the host computer will track and store the contents based on item-information collected for that tote and route it off to a reject spur. In the reject spur, tote contents is gently agitated to rearrange it within the tote so that it may be routed onto the main track for another pass through the inspection apparatus for verification, or not. If the contents of the tote is not verified after the second pass, it may be routed for a human inspection completed to verify the contents, or rework to add, remove, etc. items per order. A storage unit in communication with the host computer stores all item identifier numbers and contents of each tote in a database. The database information may then be passed to the customer computers.

Suitable, known ways to apply a label are with 'print and apply' equipment. This equipment is usually a self contained unit with the capacity to store labels in a roll format. Labels may be on continuous web and fed to a thermal transfer printer. Although typical label printing equipment has only a single print head, the unique labeling of the invention with luminescent marking+human-visible indicia employs a novel auto-printer device with a synchronized dual head print head.

The host computer unit of this EXAMPLE 1 has an object-oriented graphic user interface using an associated novel software program using multiple screens with multiple users. The host computer is in communication with each customer's database to send and receive files from respective customer's on-site computer system(s). For example, item-information collected for each item within a carrier-tote bound for a particular destination will be stored by the host computer storage unit so that, once the contents of the tote has been put in shipping-packages and shipped to the destination, notice of this is automatically forwarded (e.g., WAN, like the INTERNET or a private WAN) to the respective customer for their records. The host computer tracks carrier-totes as they are cycle/move through the main lines and reject spurs. The computer also controls the printing application for the labeling.

While certain representative embodiments and details have been shown for the purpose of illustrating features of the invention, those skilled in the art will readily appreciate that various modifications, whether specifically or expressly identified herein, may be made to these representative embodiments without departing from the novel core teachings or scope of this technical disclosure. Accordingly, all such modifications are intended to be included within the scope of the claims. Although the commonly employed preamble phrase "comprising the steps of" may be used herein, or hereafter, in a method claim, the applicants do not intend to invoke 35 U.S.C. §112 ¶6 in a manner that unduly limits rights to its innovation. Furthermore, in any claim that is filed herewith or hereafter, any means-plus-function clauses used, or later found to be present, are intended to cover at least all structure(s) described herein as performing the recited function and not only structural equivalents but also equivalent structures.

We claim:

1. An item contents verification system for use in an order fulfillment assembly line of carrier-totes each containing at least one of a plurality of items having a labeling, the system comprising:
    (a) the labeling comprising a luminescent marking and a human-visible indicia;
    (b) said luminescent marking comprising a coded-indicia generally invisible to a human eye without an irradiation, each said coded-indicia to contain item-information about the item to which the labeling is applied;
    (c) an inspection apparatus within the assembly line adapted for automatically collecting said item-information from said luminescent coded-indicia oriented outwardly and within a respective one of the carrier-totes as said respective carrier tote passes in proximity to said inspection apparatus;
    (d) said inspection apparatus comprising a source of radiation selected from the group consisting of an ultra-violet (UV) radiation source, a near-infrared (near-IR) radiation source, and an infrared (IR) radiation source for emitting at said luminescent coded-indicia;
    (e) in communication with said inspection apparatus is a processor unit adapted for comparing, while said respective one of the carrier-totes is in the assembly line, a purchase order comprising at least one selected item against said item-information collected about each said item within said respective carrier-tote; if said item-information collected is of said order, said respective carrier-tote contents is deemed verified; and
    (f) a reject spur to which any said respective carrier-tote is routed if the contents is not deemed verified.

2. The system of claim 1, wherein:
    (a) the carrier-totes are positioned for automatic movement such that said inspection apparatus is generally overhead said respective carrier-tote as said respective carrier-tote passes on a track of the assembly line; and
    (b) said luminescent marking further comprises a plurality of said coded-indicia that are substantively identical.

3. The system of claim 2:
    further comprising a tote agitation station through which said rejected carrier-tote routed to said reject spur passes prior to being routed for a second pass under said inspection apparatus.

4. The system of claim 3:
    (a) wherein said processor unit is further adapted for comparing said purchase order against a second item-information collected, during said second pass, about each said item within said agitated carrier-tote; if said second item-information collected is of said purchase order, said agitated carrier-tote contents is deemed verified; and
    (b) a manual inspection spur to which any said agitated carrier-tote is routed if the contents is not deemed verified after said second pass under said inspection apparatus.

5. The system of claim 1 wherein:
    (a) said luminescent marking further comprises a plurality of said coded-indicia in proximity with each other and organized in array fashion, at least one of said coded-indicia to overlap, at least in part, said human-visible indicia;
    (b) said inspection apparatus is computerized and further comprises a device adapted to capture said coded-indicia when illuminated by said source; and
    (c) said human-visible indicia comprises a string of alpha-numeric characters and a UPC barcode, both of which identify the item to which the labeling is applied.

6. The system of claim 1 further comprising:
    (a) a data storage unit in communication with said processor unit, said data storage unit comprising a plurality of said purchase orders, each said order bound for shipment to an assigned destination; and
    (b) each said item-information further comprises said assigned destination of the item to which the labeling is applied.

7. The system of claim 1 wherein:
    (a) the items are selected from the group consisting of a handheld computerized device, a cell phone, an optical storage disk, a magnetic storage cassette, and a packaging used for containing or otherwise clustering together smaller objects for transport; said packages selected from the group consisting of bottles, boxes, packets, pouches, tubes, envelopes, baggies, flexible-wrap, fusion material, cans, canisters, blister-packs, vacuum-formed packs, and storage media cases; and
    (b) said inspection apparatus is computerized and further comprises a source of radiation adapted for emitting at a pre-selected range during said collecting of said item-information, and a device adapted to capture said coded-indicia when illuminated by said source at said pre-selected range; said pre-selected range dedicated to a customer of said purchase order.

8. An item labeling and verification system for use in an order fulfillment assembly line of carrier-totes, the system comprising:
    (a) an apparatus for automatically applying to each of a plurality of items, a labeling comprising a luminescent marking; said labeling further comprising a human-visible indicia;
    (b) said luminescent marking comprising a coded-indicia generally invisible to a human eye without an irradiation, said coded-indicia to contain item-information about the item to which the labeling is applied;
    (c) an inspection apparatus within the assembly line adapted for collecting said item-information from said luminescent coded-indicia oriented outwardly and within a respective one of the carrier-totes as said respective carrier-tote passes in proximity to said inspection apparatus;
    (d) said inspection apparatus comprising a source of radiation selected from the group consisting of an ultra-violet (UV) radiation source, a near-infrared (near-IR) radiation source, and an infrared (IR) radiation source for emitting at said luminescent coded-indicia; and (e) in communication with said inspection apparatus is a processor unit adapted for comparing, while said respective one of the carrier-totes is in the assembly line, a purchase order comprising at least one selected item against said item-information collected about each said item within said respective carrier-tote; if said item-information collected is of said order of selected items, said respective carrier-tote contents is deemed verified.

9. The system of claim 8:

further comprising a reject spur to which any said respective carrier-tote is automatically routed if the contents is not deemed verified, and a tote agitation station through which said rejected carrier-tote routed to said reject spur passes prior to being routed for a second pass under said inspection apparatus; and a second inspection apparatus for use at a later time to recollect item-information from said luminescent coded-indicia of one of said plurality of items and comparing said recollected item-information against a database of a plurality of said item-information collected and recorded earlier, for a subsequent verification.

10. The system of claim 8 wherein:

(a) said luminescent marking further comprises a plurality of said coded-indicia organized in array fashion, at least one of said coded-indicia to overlap, at least in part, said human-visible indicia;

(b) said inspection apparatus is computerized and further comprises a source of radiation adapted for emitting at a pre-selected range during said collecting of said item-information, and a device adapted to capture said coded-indicia when illuminated by said source at said pre-selected range; said pre-selected range dedicated to an entity having placed said purchase order; and (c) said human-visible indicia comprises a string of alpha-numeric characters and a UPC barcode, both of which identify the item to which the labeling is applied.

11. An item labeling and verification system for use in an order fulfillment assembly line, the system comprising:

(a) a labeling applied to each of a plurality of items, said labeling comprising a luminescent marking and a human-visible indicia;

(b) said luminescent marking comprising a coded-indicia generally invisible to a human eye without an irradiation, said coded-indicia to contain item-information about the item to which the labeling is applied;

(c) a computerized inspection apparatus within the assembly line adapted for collecting said item-information from said luminescent coded-indicia oriented outwardly as said item passes in proximity to said inspection apparatus in the assembly line;

(d) said inspection apparatus comprising a source of radiation selected from the group consisting of an ultra-violet (UV) radiation source, a near-infrared (near-IR) radiation source, and an infrared (IR) radiation source for emitting at said luminescent coded-indicia; and (e) in communication with said inspection apparatus is a processor unit adapted for, automatically while the item moves along the assembly line, accessing a batch order made by a customer comprising items, recording said item-information collected, and comparing said item-information collected against said batch order for verification that the item to which the labeling is applied is of said batch order.

12. The system of claim 11 further comprising an apparatus for automatically applying said labeling to each of said items, and wherein:

(a) said luminescent marking further comprises a plurality of said coded-indicia that are substantively identical;

(b) said luminescent marking and said human-visible indicia both having been applied to a label medium selected from the group consisting of a clear label material, an opaque label material, a multi-layer label, and a coated label material; and (c) said inspection apparatus is computerized and further comprises a source of radiation adapted for emitting at a pre-selected range during said collecting of said item-information, and a device adapted to capture said coded-indicia when illuminated by said source at said pre-selected range; said pre-selected range associated with said batch order.

13. The system of claim 11 wherein:

(a) said luminescent marking further comprises a plurality of said coded-indicia in proximity with each other and organized in array fashion, at least one of said coded-indicia to overlap, at least in part, said human-visible indicia;

(b) said inspection apparatus is computerized and further comprises a device adapted to capture said coded-indicia when illuminated by said source; and (c) said human-visible indicia comprises a string of alpha-numeric characters.

14. The system of claim 11 for use with a plurality of carrier-totes, each containing at least one of the plurality of items having the labeling, and wherein:

the carrier-totes are positioned for automatic movement such that said inspection apparatus is generally overhead said respective carrier-tote as said respective carrier-tote passes on a track of the assembly line.

15. The system of claim 11:

(a) wherein the items are selected from the group consisting of a handheld computerized device, a cell phone, an optical storage disk, a magnetic storage cassette, and a packaging used for containing or otherwise clustering together smaller objects for transport; said packages selected from the group consisting of bottles, boxes, packets, pouches, tubes, envelopes, baggies, flexible-wrap, fusion material, cans, canisters, blister-packs, vacuum-formed packs, and storage media cases; and (b) further comprising a data storage unit in communication with said processor unit, said data storage unit comprising a plurality of records of said item-information collected for subsequent verification of said item.

16. The system of claim 11 wherein said inspection apparatus is a computerized in-line hand-held unit, and further comprising:

(a) a data storage unit in communication with said processor unit, said data storage unit comprising a plurality of records of said item-information collected for subsequent verification of said item;

(b) a reject spur to which any said item is automatically routed if not deemed verified; and (c) a second inspection apparatus for use at a later time to recollect item-information from said luminescent coded-indicia of one of said plurality of items and comparing said recollected item-information against a database of a plurality of said item-information collected and recorded earlier, for a subsequent verification.

17. A labeling for use with a computerized inspection apparatus for verification of items within an order fulfillment assembly line:

(I) the labeling comprising:
  (a) a luminescent marking and a human-visible indicia; and (b) said luminescent marking comprising a plurality of substantively identical coded-indicia in proximity with each other and generally invisible to a human eye without an irradiation, each said coded-indicia to contain item-information about an item to which the labeling is applied;
(II) the inspection apparatus comprising:
  (a) a source of radiation selected from the group consisting of an ultra-violet (UV) radiation source, a near-infrared (near-IR) radiation source, and an infrared (IR) radiation source, emitted for collection of said item-information from items moving within the assembly line; and (b) a device adapted to capture said coded-indicia when illuminated by said source of radiation; and
(III) the inspection apparatus in communication with a processor unit adapted for an in-line verification of item fulfillment of a customer purchase order, said verification to comprise comparing said item-information collected for a selection of the items against said purchase order.

18. The labeling of claim 17 wherein:
  (a) said plurality of coded-indicia is organized in array fashion;
  (b) said luminescent marking is applied after said human-visible indicia is present on the item; and
  (c) the items are selected from the group consisting of a handheld computerized device, a cell phone, an optical storage disk, a magnetic storage cassette, and a packaging used for containing or otherwise clustering together a smaller object for transport; said packages selected from the group consisting of bottles, boxes, packets, pouches, tubes, envelopes, baggies, flexible-wrap, fusion material, cans, canisters, blister-packs, vacuum-formed packs, and storage media cases.

19. The labeling of claim 17 applied to each of a plurality of items moving within the order fulfillment assembly line comprising the inspection apparatus, and wherein:
  (a) said luminescent marking is applied to a label medium after said human-visible indicia is present thereon; and
  (b) said label medium selected from the group consisting of a clear label material, an opaque label material, a multi-layer label, and a coated label material.

20. The labeling of claim 19 wherein said label medium comprises said multi-layer label and said luminescent marking is applied to a clear layer laminated atop a second layer having said human-visible indicia.

21. The labeling of claim 17 wherein:
  (a) said human-visible indicia comprises a string of alpha-numeric characters to identify the item to which the labeling is applied;
  (b) said luminescent marking and said human-visible indicia both having been applied to a label medium selected from the group consisting of a clear label material, an opaque label material, a multi-layer label, and a coated label material; and
  (c) said inspection apparatus is computerized and further comprises a source of radiation adapted for emitting at a pre-selected range during said collecting of said item-information, and a device adapted to capture said coded-indicia when illuminated by said source at said pre-selected range; said pre-selected range dedicated to an entity having placed said customer purchase order.

22. The labeling of claim 17 applied to each of a plurality of items, at least one of which is contained in each of a plurality of carrier-totes moving within the order fulfillment assembly line, and wherein:
  (a) said luminescent marking overlaps, at least in part, said human-visible indicia;
  (b) said human-visible indicia further comprises a Uniform Product Code (UPC) barcode to identify the item to which the labeling will be applied; and
  (c) said item-information further comprises a security code assigned to the item for a subsequent verification thereof.

23. The labeling of claim 17 applied to each of a plurality of items, at least one of which is contained in each of a plurality of carrier-totes moving within the order fulfillment assembly line, and wherein: said in-line verification is done by comparing said customer purchase order against said item-information collected about each said item of said selection of the items contained within a respective carrier-tote; and if said item-information collected by the inspection apparatus is of said customer purchase order, said respective carrier-tote contents is deemed verified.

24. A method of labeling items for verification of contents within each of a plurality of carrier-totes in an order fulfillment assembly line, the method comprising the steps of:
  (a) applying a labeling to each of a plurality of items comprising applying a luminescent marking and a human-visible indicia;
  (b) said luminescent marking comprising a coded-indicia, generally invisible to a human eye without an irradiation, that contains item-information about the item to which said labeling is applied;
  (c) collecting said item-information from said luminescent coded-indicia oriented outwardly of said items within a respective one of the carrier-totes, said step of collecting comprising: emitting radiation selected from the group consisting of ultra-violet (UV) radiation, near-infrared (near-IR) radiation, and infrared (IR) radiation from a source, and reading said coded-indicia when illuminated by said source; and
  (d) comparing, while said respective one of the carrier-totes is in the assembly line, a purchase order comprising at least one selected item against said item-information collected about each of the items within said respective carrier-tote; if said item-information collected is of said order of selected items, said respective carrier-tote contents is deemed verified; but if said item-information collected is not of said order of selected items, said respective carrier-tote is automatically routed, before leaving the assembly line, to a reject spur.

25. The method of claim 24, further comprising the steps of:
  (a) if said respective carrier-tote is routed to said reject spur, agitating the contents of said once-rejected respective carrier-tote; and
  (b) automatically routing said agitated once-rejected carrier-tote for a second pass under said inspection apparatus.

26. The method of claim 24, further comprising the steps of: comparing said order of selected items against a second item-information collected, during said second pass, about each said item within said agitated once-rejected carrier-tote; if said second item-information collected is not of said order of selected items, said agitated once-rejected carrier-tote contents is not deemed verified, then routed to a manual inspection spur.

27. The method of claim 24 wherein said step of applying said labeling to each of a plurality of items further comprises:
- (a) automatically applying said luminescent marking to a label medium after said human-visible indicia is present thereon; and
- (b) automatically applying said label medium with said luminescent marking and said human-visible indicia, to each of said items according to order instructions stored in a data storage unit.

28. The method of claim 24:
- (a) wherein said step of applying said labeling to each of a plurality of items further comprises automatically applying said luminescent marking after said human-visible indicia is present on each of said items; and said step of collecting said item-information further comprises passing said respective one of the carrier-totes in proximity to an inspection station within the assembly line, and recording said item-information collected for each said items; and
- (b) further comprising the step of, using a second inspection apparatus at a later time, recollecting item-information from said luminescent coded-indicia of a respective said item and comparing said recollected item-information against a database of a plurality of said item-information collected and recorded earlier, for a subsequent verification.

29. A method of labeling items for verification within an order fulfillment assembly line, the method comprising the steps of:
- (a) applying a labeling to each of a plurality of items, comprising applying a luminescent marking and a human-visible indicia;
- (b) said luminescent marking comprising a coded-indicia, generally invisible to a human eye without an irradiation, that contains item-information about the item to which said labeling is applied;
- (c) collecting said item-information from said luminescent coded-indicia oriented outwardly of each said item as each said item passes in proximity to an inspection apparatus in the assembly line, said step of collecting comprising: emitting radiation selected from the group infrared (IR) radiation from a source, and reading said coded-indicia when illuminated by said source; and
- (d) automatically while the item moves along the assembly line, accessing a batch order made by a customer comprising items, and if said item-information collected for a respective one of the items is of said batch order of items, it is deemed verified; but if said respective one of the items is not of said batch order of items, automatically routing, before leaving the assembly line, said respective one of the items to a reject spur.

30. The method of claim 29 wherein:
- (a) said step of applying said labeling further comprises applying said luminescent marking to comprise a plurality of said coded-indicia in proximity with each other and that are substantively identical;
- (b) said step of collecting said item-information further comprises emitting radiation at a pre-selected range from said source and reading said coded-indicia when illuminated by said source at said pre-selected range.

31. A method of labeling items for verification thereof within an order fulfillment assembly line, the method comprising the steps of:
- (a) applying a labeling to each of a plurality of items comprising automatically applying a luminescent marking; said labeling further comprising a human-visible indicia;
- (b) said luminescent marking comprising a plurality of substantively identical coded-indicia in proximity with each other and generally invisible to a human eye without an irradiation, that contains item-information about the item to which said labeling is applied;
- (c) using a computerized inspection apparatus within the assembly line through which said plurality of items are passed, automatically collecting and recording said item-information from said luminescent coded-indicia;
- (d) said step of automatically collecting comprising: emitting radiation selected from the group consisting of ultra-violet (UV) radiation, near-infrared (near-IR) radiation, and infrared (IR) radiation from a source, and reading said coded-indicia when illuminated by said source; and
- (e) comparing, while each of said plurality of items is moving within the assembly line, a customer purchase order against said item-information collected from each said item.

32. The method of claim 31 wherein the verification is of contents of any of the items within each of a plurality of carrier-totes in said assembly line, wherein the step of comparing said customer purchase order is done by comparing against said item-information collected about each of the items within a respective carrier-tote; if said item-information collected is of said customer purchase order, said respective carrier-tote contents is deemed verified; but if said item-information collected is not of said customer purchase order, said respective carrier-tote is routed to a reject spur.

33. The method of claim 31 wherein said step of applying said labeling to each of a plurality of items further comprises:
- (a) automatically applying said luminescent marking to a label medium after said human-visible indicia is present thereon;
- (b) automatically applying said label medium with said luminescent marking and said human-visible indicia, to each of said items according to order instructions stored in a data storage unit; and
- (c) using a second inspection apparatus at a subsequent time, recollecting item-information from said luminescent coded-indicia and comparing said recollected item-information against a database of a plurality of said item-information collected and recorded earlier, for the verification.

34. The method of claim 31 wherein said step of applying said labeling to each of a plurality of items further comprises automatically applying said luminescent marking after said human-visible indicia is present on each of said items, said item-information further comprises a security code assigned to said item for the verification thereof.

* * * * *

UNITED STATES PATENT AND TRADEMARK OFFICE
CERTIFICATE OF CORRECTION

PATENT NO.       : 7,918,402 B2                                    Page 1 of 1
APPLICATION NO.  : 11/714491
DATED            : April 5, 2011
INVENTOR(S)      : Kevin M. Conlon and Timothy J. Owens It is certified that error appears in the above-identified patent and that said Letters Patent is hereby corrected as shown below:

In column 19, line 41 (claim 29), after "group" insert -- consisting of ultra-violet (UV) radiation, near-infrared (near-IR) radiation, and --.

Signed and Sealed this
Sixth Day of September, 2011

David J. Kappos
*Director of the United States Patent and Trademark Office*